US012662153B2

(12) United States Patent
Forster et al.

(10) Patent No.: US 12,662,153 B2
(45) Date of Patent: Jun. 23, 2026

(54) DRIVER MONITORING SYSTEM FOR A VEHICLE AND METHOD FOR DRIVER MONITORING

(71) Applicant: Bayerische Motoren Werke Aktiengesellschaft, Munich (DE)

(72) Inventors: Yannick Forster, Munich (DE); Frederik Naujoks, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 8 days.

(21) Appl. No.: 18/922,604

(22) Filed: Oct. 22, 2024

(65) Prior Publication Data

US 2025/0128730 A1     Apr. 24, 2025

(30) Foreign Application Priority Data

Oct. 23, 2023     (DE) ..................... 10 2023 129 029.0

(51) Int. Cl.
| | |
|---|---|
| *B60W 50/14* | (2020.01) |
| *B60W 40/08* | (2012.01) |
| *B60W 50/00* | (2006.01) |

(52) U.S. Cl.
CPC ........... *B60W 50/14* (2013.01); *B60W 40/08* (2013.01); *B60W 2040/0818* (2013.01); *B60W 2050/0083* (2013.01); *B60W 2050/143* (2013.01); *B60W 2050/146* (2013.01); *B60W 2540/229* (2020.02)

(58) Field of Classification Search
CPC ................. B60W 50/14; B60W 40/08; B60W 2540/229; B60W 2040/0818; B60W 2050/0083; B60W 2050/143; B60W 2050/146

USPC .......................................................... 340/576
See application file for complete search history.

(56) References Cited

U.S. PATENT DOCUMENTS

| | | | |
|---|---|---|---|
| 2012/0098678 A1* | 4/2012 | Rathmacher ....... | G01C 21/3697 340/576 |
| 2019/0005341 A1* | 1/2019 | Korthauer ............. | B60W 40/08 |
| 2020/0094698 A1* | 3/2020 | Imai ...................... | A61B 5/168 |

(Continued)

FOREIGN PATENT DOCUMENTS

DE     10 2022 106 203 A1     9/2023

OTHER PUBLICATIONS

German-language Search Report issued in German Application No. 10 2023 129 029.0 dated Jul. 1, 2024 with partial English translation (10 pages).

*Primary Examiner* — Kam Wan Ma
(74) *Attorney, Agent, or Firm* — Crowell & Moring LLP

(57)     ABSTRACT

A driver monitoring system for a vehicle has at least one output device, a monitoring module, and a control module. The output device is configured to output at least one attentiveness warning. The monitoring module is configured to monitor a driver of the vehicle and to recognize inattentiveness states of the driver. The control module is configured to accumulate a duration of the recognized inattentiveness states within a finite time window having a predetermined length in order to determine an accumulated inattentiveness duration for the finite time window and to actuate the at least one output device for the output of the at least one attentiveness warning based on the accumulated inattentiveness duration and a tempo measure of an increase of the accumulated inattentiveness duration.

11 Claims, 3 Drawing Sheets

(56)          References Cited

U.S. PATENT DOCUMENTS

2023/0192097 A1 *  6/2023  Ito ........................ B60W 30/16
                                                        701/1

* cited by examiner

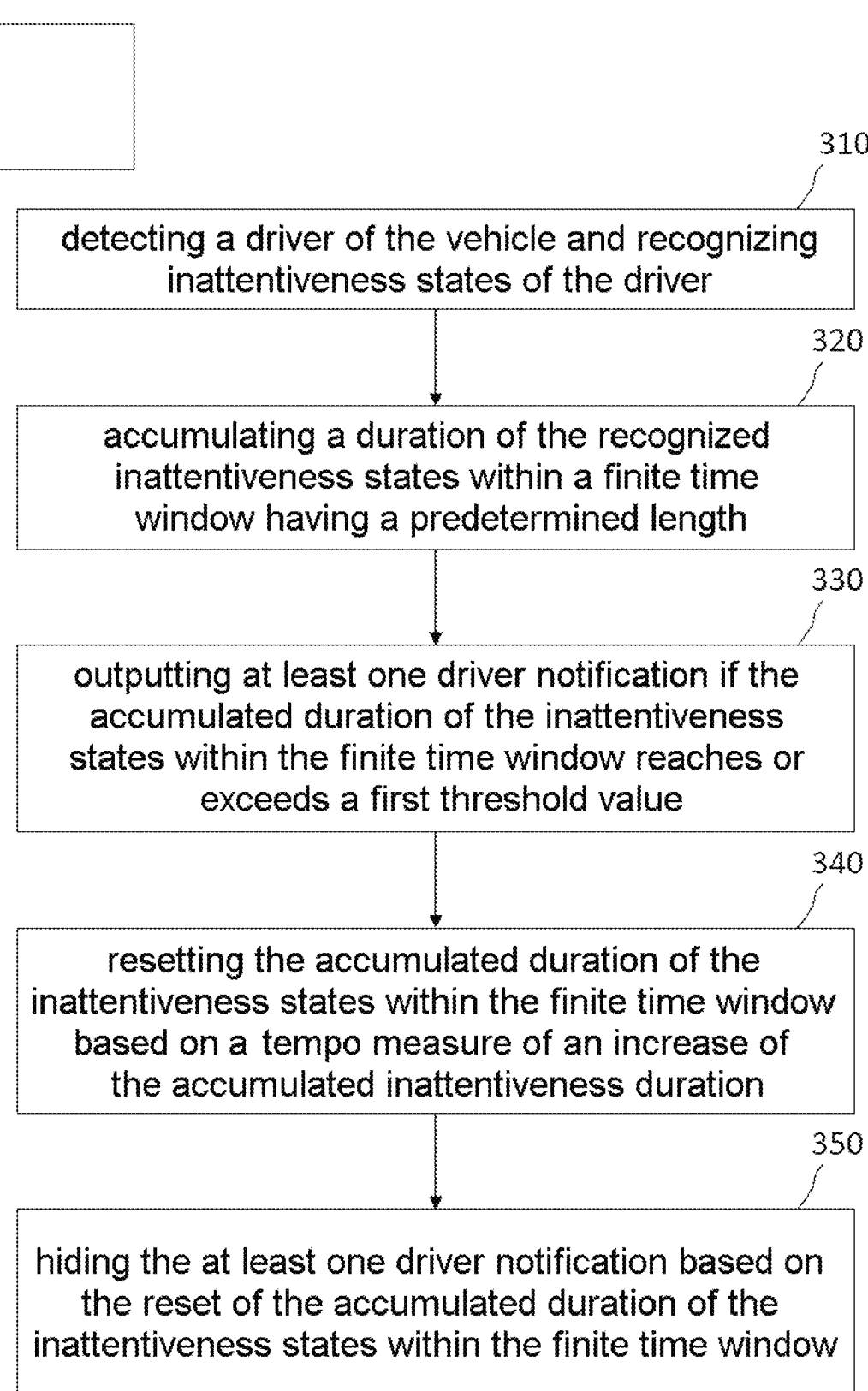

310 detecting a driver of the vehicle and recognizing inattentiveness states of the driver

320 accumulating a duration of the recognized inattentiveness states within a finite time window having a predetermined length

330 outputting at least one driver notification if the accumulated duration of the inattentiveness states within the finite time window reaches or exceeds a first threshold value

340 resetting the accumulated duration of the inattentiveness states within the finite time window based on a tempo measure of an increase of the accumulated inattentiveness duration

350 hiding the at least one driver notification based on the reset of the accumulated duration of the inattentiveness states within the finite time window

Fig. 3

DRIVER MONITORING SYSTEM FOR A VEHICLE AND METHOD FOR DRIVER MONITORING

CROSS REFERENCE TO RELATED APPLICATION

This application claims priority under 35 U.S.C. § 119 from German Patent Application No. DE 10 2023 129 029.0, filed Oct. 23, 2023, the entire disclosure of which is herein expressly incorporated by reference.

BACKGROUND AND SUMMARY

The present disclosure relates to a driver monitoring system for a vehicle, a vehicle having such a driver monitoring system, a method for driver monitoring, and a storage medium for carrying out the method. The present disclosure relates in particular to an intelligent output of driver instructions, in particular attentiveness warnings.

In modern vehicles, driver monitoring systems (DMS) are increasingly being installed, which monitor a driver using an interior camera and, for example, output a warning if the driver does not look at the road for a long period of time. Such driver monitoring systems are to increase the level of safety in road traffic.

According to the EuroNCAP protocol, a distraction of the driver can be recognized for example when the driver looks away from the windshield for longer than 3 seconds or has looked away from the windshield for a cumulative 10 seconds within the last 30 seconds. There are various approaches for designing corresponding acoustic and/or visual warning messages. For example, a visual display can be shown in the course of the accumulation, so that the display is initially only weakly recognizable and becomes more and more visually clear with increasing approach to a threshold of an acoustic warning trigger. After the driver has directed his attention back onto the road and this is recognized by the driver monitoring system, the display can be hidden again. The display or warning message is shown or hidden here according to preset fixed rules.

It is an object of the present disclosure to provide a driver monitoring system for a vehicle, a vehicle having such a driver monitoring system, a method for driver monitoring, and a storage medium for carrying out the method, which enable an intelligent output of attentiveness warnings. In particular, it is an object of the present disclosure to carry out an output of attentiveness warnings in a manner adapted to the situation and individually for the driver.

This object is achieved by the subject matter of the independent claims. Advantageous embodiments are specified in the dependent claims.

According to one independent aspect of the present disclosure, a driver monitoring system for a vehicle, in particular a motor vehicle, is provided. The driver monitoring system comprises at least one output device configured to output at least one attentiveness warning; a monitoring module configured to monitor a driver of the vehicle and detect inattentiveness states of the driver; and a control module configured to:

accumulate a duration of the detected inattentiveness states within a finite time window having a predetermined length, in order to determine an accumulated inattentiveness duration for the finite time window; and
actuate the at least one output device for the output of the at least one attentiveness warning based on the accumulated inattentiveness duration and a tempo measure of an increase of the accumulated inattentiveness duration.

According to the invention, the output of the attentiveness warnings is adapted based on a tempo measure of an increase of the accumulated inattentiveness duration. In particular, a reset of the accumulated inattentiveness duration and thus, for example, hiding of the inattentiveness warnings can be adapted to the speed of the increase of the accumulated inattentiveness duration, so that the hiding of the attentiveness warning does not take place analogously to the accumulated inattentiveness duration. If the accumulation takes place very rapidly, for example, due to numerous inattentiveness states detected in a short time, it can be presumed that the driver tends toward distractions. In this case, the reset of the accumulated inattentiveness duration can be adapted so that the accumulation is reset more slowly and therefore the hiding of the attentiveness warning is delayed. As a result, an output of attentiveness warnings adapted to the situation and individual to the driver can take place, so that the driver can be assisted better and in a more lasting manner in the vehicle control. Moreover, better effectiveness of warning messages can be achieved, by which traffic safety can also be increased.

The driver monitoring system, in particular the monitoring module, preferably comprises at least one sensor configured to detect the driver and to provide corresponding detection data. The at least one sensor can be an optical sensor, such as a camera, in particular an interior camera. The driver monitoring system, in particular the monitoring module, can optionally comprise at least one light source. In some embodiments, the light source can be an infrared light source and the at least one sensor can be an infrared sensor, such as an infrared camera.

The monitoring module can be configured to evaluate the detection data provided by the at least one sensor, such as image data. A viewing direction of the driver is detectable or determinable by the evaluation of the detection data, for example.

The monitoring module can typically be configured to detect the viewing direction by means of eye tracking. The term "eye tracking" is understood in particular as a detection of eye movements which are detected, for example, by a camera of the interior sensor system. Findings can thus be obtained about where a person is looking.

The monitoring module can be configured to determine whether the viewing direction of the driver deviates from a reference viewing direction. The reference viewing direction is preferably a viewing direction toward a roadway located in front of the vehicle and/or a windshield. If the viewing direction of the driver deviates from the reference viewing direction, thus if the driver looks away from the road and/or the windshield, this event can be recognized as an inattentiveness state. A viewing time duration can specify here how long the driver does not look in the reference viewing direction or how long the driver looks away from the reference viewing direction. This viewing time duration can be added up for the recognized inattentiveness states in order to determine the accumulated inattentiveness duration.

The at least one attentiveness warning preferably comprises or is an attentiveness notification.

The at least one attentiveness warning preferably comprises or is an optical and/or acoustic attentiveness notification.

The at least one output device can comprise at least one display device for outputting the at least one optical or visual attentiveness notification and/or at least one loudspeaker for outputting the at least one acoustic attentiveness notification. The at least one display device can comprise a display, in particular an LCD display, a plasma display, or an OLED display. Additionally or alternatively, the at least one display device can comprise a projection device configured to show information directly in the field of view of the driver, in particular to project it on a windshield. In some embodiments, the at least one display device can be a central information output device of an infotainment system, such as a head unit or a pillar-to-pillar display. The at least one output device is preferably permanently installed in the vehicle.

The control module is preferably configured to actuate the at least one output device to output or show the at least one attentiveness warning when the accumulated inattentiveness duration reaches or exceeds a first threshold value.

The control module is preferably configured to actuate the at least one output device to hide the at least one attentiveness warning when the accumulated inattentiveness duration subsequently reaches or falls below the first threshold value or a second threshold value (different from the first threshold value).

The first threshold value can be in the range between 5 and 15 seconds. In some embodiments, the first threshold value can be 10 seconds.

The second threshold value can be in the range between 5 and 15 seconds. In some embodiments, the second threshold value can be 10 seconds.

The finite time window is preferably a sliding time window. "Sliding" means that new values are progressively added to the accumulated inattentiveness duration while older values fall out or are removed from the accumulated inattentiveness duration ("first in, first out").

An end of the sliding time window preferably corresponds to a current time. A beginning of the sliding time window can therefore be a point in time which corresponds to a current time minus the predetermined length of the time window.

The time window can also be referred to as a "time interval".

The predetermined length of the finite time window is preferably in the range between 10 and 50 seconds or in the range between 20 and 40 seconds. In some embodiments, the predetermined length of the finite time window can be 30 seconds.

The tempo measure of the increase of the accumulated inattentiveness duration preferably corresponds to a slope of the accumulated inattentiveness duration over time. In other words, a steadiness of the accumulated inattentiveness duration can be checked. In particular, the slope of the accumulated inattentiveness duration can correspond to a first derivative of the accumulated inattentiveness duration according to time. The greater the value of the first derivative, the faster or steeper the increase and the higher the distraction of the driver. The smaller the value of the first derivative, the lower or flatter the increase and the lower the distraction of the driver.

The control module is preferably configured to carry out a reset of the accumulated inattentiveness duration based on the tempo measure of the increase of the accumulated inattentiveness duration. The term "reset" as used in the scope of the present disclosure relates to a removal of the older values from the accumulated inattentiveness duration. The removal of the older values from the accumulated inattentiveness duration can have the result that the accumulated inattentiveness duration decreases upon corresponding attentiveness of the driver and, for example, falls below the warning threshold, whereupon the warning notification is hidden.

The control module is preferably configured to carry out the reset of the accumulated inattentiveness duration more slowly the greater the tempo measure is. In other words, the reset can take place more slowly the steeper the increase of the accumulated inattentiveness duration is. The at least one attentiveness warning can therefore be displayed longer if the driver tends toward inattentiveness.

The control module is preferably configured to carry out the reset of the accumulated inattentiveness duration more quickly the smaller the tempo measure is. In other words, the reset can take place more quickly the flatter the increase of the accumulated inattentiveness duration is. The at least one attentiveness warning can therefore be displayed for a shorter time if the driver does not tend toward inattentiveness and reacts quickly to the attentiveness warning.

The control module is preferably configured to set the predetermined duration of the finite time window variably based on the tempo measure of the increase of the accumulated inattentiveness duration, in particular to set (variably) a speed of the reset of the accumulated inattentiveness duration.

The control module is preferably configured to increase the predetermined duration of the finite time window for a high tempo measure and therefore to slow the reset of the accumulated inattentiveness duration. The at least one attentiveness warning can therefore be displayed longer if the driver tends toward inattentiveness.

The control module is preferably configured to reduce the predetermined duration of the finite time window for a low tempo measure and/or to set it to a reference value or standard value and thus to accelerate the reset of the accumulated inattentiveness duration. The at least one attentiveness warning can therefore be displayed more briefly if the driver does not tend toward inattentiveness and reacts quickly to the attentiveness warning.

The control module is preferably configured to increase the predetermined duration of the finite time window if the tempo measure reaches or exceeds a threshold. For example, the predetermined duration of the finite time window can be set to a reference value or standard value and can be adjusted to a higher value only upon reaching or exceeding the threshold.

The control module is preferably configured to increase and/or reduce the predetermined duration of the finite time window in accordance with the tempo measure. For example, the predetermined duration of the finite time window can be increased and reduced continuously or step-by-step (for example proportionally to the tempo measure).

According to a further independent aspect of the present disclosure, a vehicle, in particular a motor vehicle, is provided. The vehicle comprises the driver monitoring system according to the embodiments of the present disclosure.

The term vehicle comprises passenger vehicles, trucks, minivans, buses, caravans, motorcycles, etc. which are used to convey persons, products, etc. In particular, the term comprises motor vehicles for conveying people.

According to a further independent aspect of the present disclosure, a method for driver monitoring is provided. The method comprises detecting a driver of the vehicle and recognizing inattentiveness states of the driver; accumulating a duration of the recognized inattentiveness states within a finite time window having a predetermined length; outputting at least one attentiveness warning if the accumulated duration of the inattentiveness states within the finite time window reaches or exceeds a first threshold value; resetting the accumulated duration of the inattentiveness states within the finite time window based on a tempo measure of an increase of the accumulated inattentiveness duration; and hiding the at least one attentiveness warning based on the reset of the accumulated duration of the inattentiveness states within the finite time window.

The method can implement the aspects of the driver monitoring system described in this document.

According to a further independent aspect of the present disclosure, a software (SW) program is provided. The SW program can be configured to be executed on one or more processors and to thus carry out the method for driver monitoring described in this document.

According to further independent aspect of the present disclosure, a storage medium is provided. The storage medium can comprise an SW program configured to be executed on one or more processors and to thus carry out the method for driver monitoring described in this document.

According to a further independent aspect of the present disclosure, software having program code is provided. The software is configured to carry out the method for driver monitoring when the software runs on one or more software-controlled devices.

According to a further independent aspect of the present disclosure, a driver monitoring system is provided. The driver monitoring system comprises one or multiple processors; and at least one memory, which is connected to the one or the multiple processors and contains instructions which can be executed by the one or the multiple processors in order to carry out the method for driver monitoring described in this document.

A processor or a processor module is a programmable arithmetic unit, thus a machine or an electronic circuit which controls other elements according to transferred commands and drives an algorithm (process) in this case.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 is a flow chart of a method for driver monitoring according to embodiments of the present disclosure.

If not indicated otherwise, identical reference signs are used hereinafter for identical and identically-acting elements.

DETAILED DESCRIPTION OF THE DRAWINGS

Figure 1:
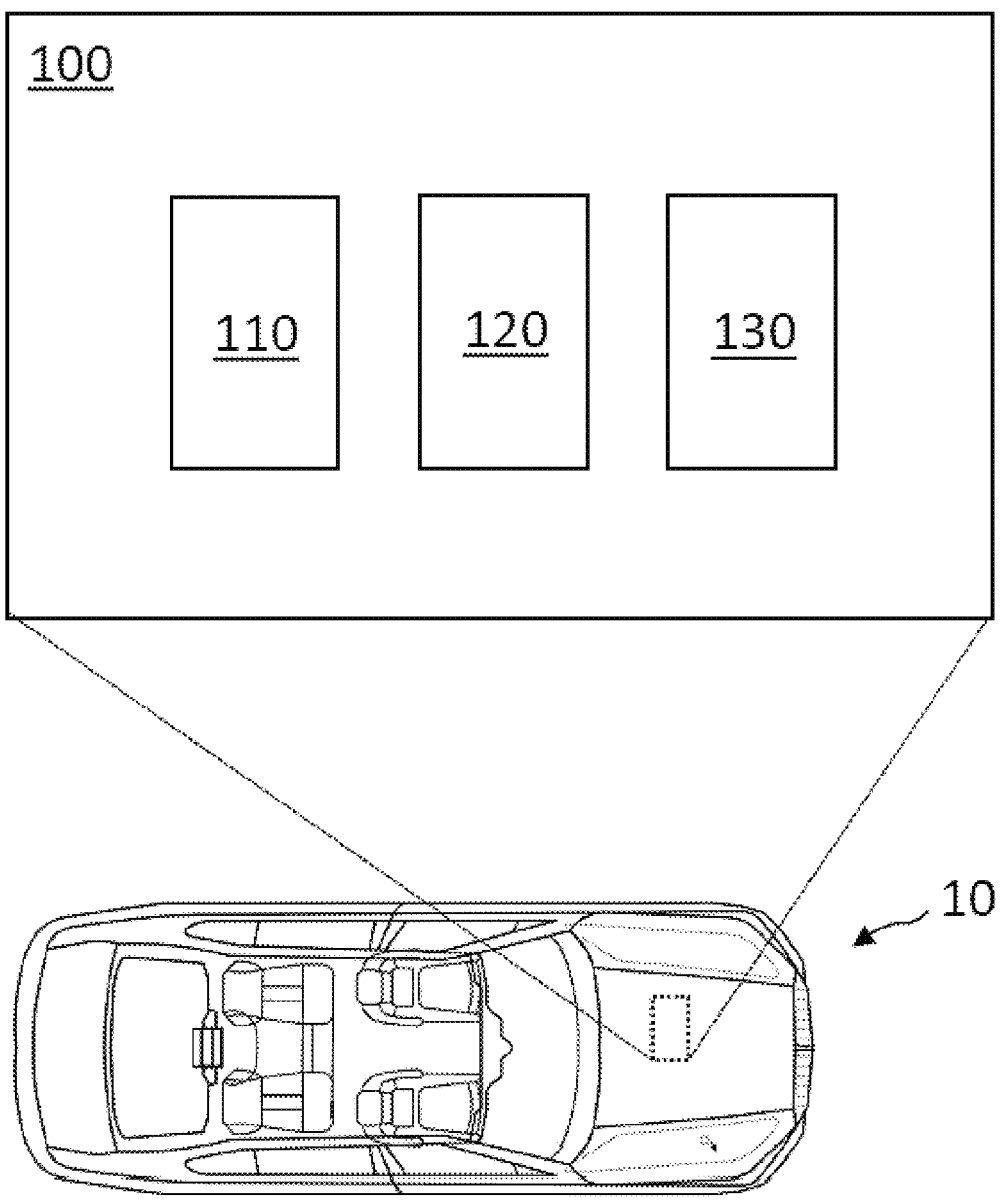
FIG. 1 schematically shows a vehicle having a driver monitoring system according to embodiments of the present disclosure.
Figure 2:
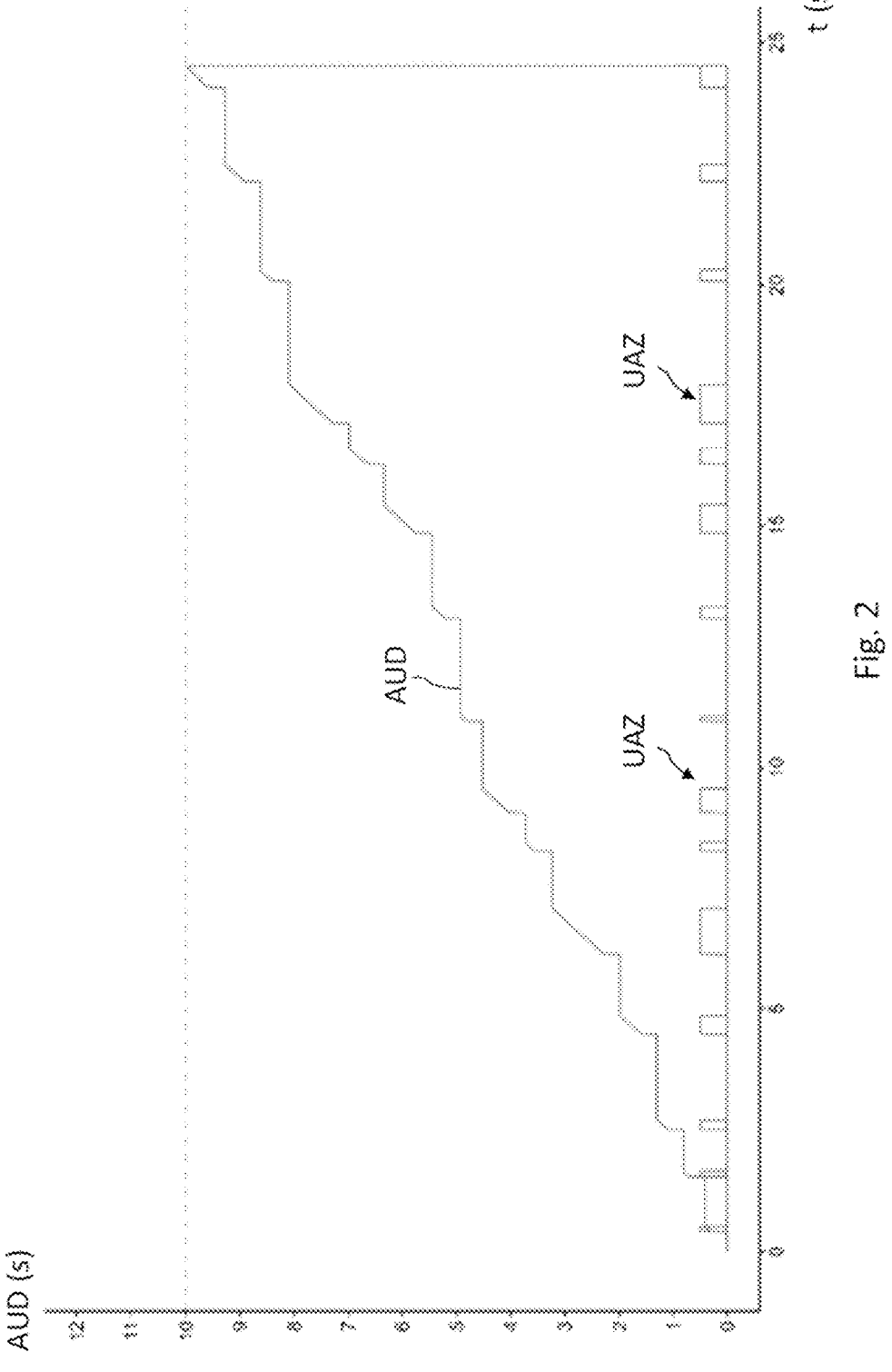
FIG. 2 schematically shows an accumulated inattentiveness duration according to embodiments of the present disclosure.

FIG. 1 schematically shows a vehicle 10 having a driver monitoring system 100 according to embodiments of the present disclosure. FIG. 2 schematically shows an accumulated inattentiveness duration AUD according to embodiments of the present disclosure.

The driver monitoring system 100 comprises at least one output device 110 configured to output at least one attentiveness warning, for example an attentiveness notification;

a monitoring module 120 configured to monitor a driver of the vehicle 10 and recognize inattentiveness states of the driver; and a control module 130 configured to accumulate a duration of the recognized inattentiveness states UAZ within a finite time window having a predetermined length in order to determine an accumulated inattentiveness duration AUD for the finite time window; and the at least one output device 110 for outputting the at least one attentiveness warning based on the accumulated inattentiveness duration AUD and to actuate a tempo measure of an increase of the accumulated inattentiveness duration AUD.

The at least one attentiveness warning can comprise an optical and/or acoustic attentiveness notification. The at least one output device 110 can comprise at least one display device for outputting the at least one optical or visual attentiveness notification and/or at least one loudspeaker for outputting the at least one acoustic attentiveness notification. The at least one display device can comprise a display, in particular an LCD display, a plasma display, or an OLED display. Additionally or alternatively, the at least one display device can comprise a projection device configured to show information directly in the field of view of the driver, in particular to project it on a windshield. In some embodiments, the at least one display device can be a central information output device of an infotainment system, such as a head unit or a pillar-to-pillar display. The at least one output device is preferably permanently installed in the vehicle.

The monitoring module 120 can comprise at least one sensor configured to detect the driver and provide corresponding detection data. The at least one sensor can be an optical sensor, such as a camera, in particular an interior camera. The monitoring module 120 can furthermore be configured to evaluate the detection data provided by the at least one sensor, for example image data. For example, a viewing direction of the driver is detectable or determinable by the evaluation of the detection data. The monitoring module 120 can typically be configured to detect the viewing direction by means of eye tracking.

The monitoring module 120 can be configured to determine whether the viewing direction of the driver deviates from a reference viewing direction. The reference viewing direction is preferably a viewing direction toward a roadway lying in front of the vehicle 10 and/or a windshield. If the viewing direction of the driver deviates from the reference viewing direction, thus if the driver looks away from the road and/or the windshield, this event can be recognized as an inattentiveness state UAZ. A viewing time duration can specify how long the driver does not look in the reference viewing direction or how long the driver looks away from the reference viewing direction. This viewing time duration can be added up for the recognized inattentiveness states UAZ in order to determine the accumulated inattentiveness duration AUD.

The control module 130 can be configured to actuate the at least one output device 110 to output or show the at least one attentiveness warning if the accumulated inattentiveness duration AUD reaches or exceeds a first threshold value. In the example of FIG. 2, the first threshold value is 10 seconds. The control module 130 can furthermore be configured to actuate the at least one output device 110 to hide the at least one attentiveness warning if the accumulated inattentiveness duration AUD subsequently reaches or falls below the first threshold value or a second threshold value (different from the first threshold value).

The finite time window can be a sliding time window. "Sliding" means that new values are progressively added to the accumulated inattentiveness duration AUD while older values fall out or are removed from the accumulated inattentiveness duration ("first in, first out"). An end of the sliding time window can correspond to a current time. A beginning of the sliding time window can therefore be a point in time which corresponds to a current time minus the predetermined length of the time window.

The predetermined length of the finite time window can be in the range between 10 and 50 seconds or in the range between 20 and 40 seconds. In some embodiments, the predetermined length of the finite time window can be 30 seconds.

The tempo measure of the increase of the accumulated inattentiveness duration AUD can correspond to a slope of the accumulated inattentiveness duration AUD over time. In other words, a steadiness of the accumulated inattentiveness duration AUD can be checked. In particular, the slope of the accumulated inattentiveness duration AUD can correspond to a first derivative of the accumulated inattentiveness duration AUD according to time. The greater the value of the first derivative, the faster or steeper the increase and the higher the distraction of the driver. The smaller the value of the first derivative, the lower or flatter the increase and the lower the distraction of the driver.

The control module 130 can be configured to carry out a reset of the accumulated inattentiveness duration AUD based on the tempo measure of the increase of the accumulated inattentiveness duration AUD. For example, the reset of the accumulated inattentiveness duration AUD can take place more slowly the greater the tempo measure is. The at least one attentiveness warning can therefore be displayed longer if the driver tends toward inattentiveness. Similarly, the reset of the accumulated inattentiveness duration AUD can take place more quickly the smaller the tempo measure is. The at least one attentiveness warning can therefore be displayed more briefly if the driver does not tend toward inattentiveness and reacts quickly to the attentiveness warning.

The control module 130 is preferably configured to set the predetermined duration of the finite time window variably based on the tempo measure of the increase of the accumulated inattentiveness duration AUD, in particular in order to set (variably) a speed of the reset of the accumulated inattentiveness duration AUD. In particular, the predetermined duration of the finite time window can be increased for a high tempo measure and the reset of the accumulated inattentiveness duration AUD can therefore be slowed. The at least one attentiveness warning can therefore be displayed longer if the driver tends toward inattentiveness. Similarly, the predetermined duration of the finite time window can be reduced for a low tempo measure and the reset of the accumulated inattentiveness duration AUD can therefore be accelerated.

In some embodiments, the control module 130 can be configured to increase the predetermined duration of the finite time window if the tempo measure reaches or exceeds a threshold. For example, the predetermined duration of the finite time window can be set to a reference value or standard value and can only be adjusted to a higher value upon reaching or exceeding the threshold. Alternatively, the control module 130 can be configured to increase and/or reduce the predetermined duration of the finite time window continuously and proportionally to the tempo measure.

FIG. 3 schematically shows a flowchart of a method 300 for driver monitoring according to embodiments of the present disclosure. The method 300 can be implemented by corresponding software that is executable by one or more processors (such as a CPU).

The method 300 comprises, in block 310, detecting a driver of the vehicle and recognizing inattentiveness states of the driver; in block 320, accumulating a duration of the recognized inattentiveness states within a finite time window having a predetermined length; in block 330, outputting at least one attentiveness warning if the accumulated duration of the inattentiveness states within the finite time window reaches or exceeds a first threshold value; in block 340, resetting the accumulated duration of the inattentiveness states within the finite time window based on a tempo measure of an increase of the accumulated inattentiveness duration; and, in block 350, hiding the at least one attentiveness warning based on the reset of the accumulated duration of the inattentiveness states within the finite time window.

According to the invention, the output of the attentiveness warning is adapted based on a tempo measure of an increase of the accumulated inattentiveness duration. In particular, resetting the accumulated inattentiveness duration and therefore, for example, hiding the attentiveness warnings can be adapted to the speed of the increase of the accumulated inattentiveness duration, so that the hiding of the attentiveness warning does not take place analogously to the accumulated inattentiveness duration. If the accumulation takes place very quickly, for example, due to numerous inattentiveness states recognized in a short time, it can be presumed that the driver tends toward distractions. In this case, the reset of the accumulated inattentiveness duration can be adapted so that the accumulation is reset more slowly and therefore the hiding of the attentiveness warning is delayed. As a result, an output of attentiveness warnings adapted to the situation and individual for the driver can take place, so that the driver can be assisted better and more lastingly in the vehicle control. Moreover, better effectiveness of warning messages can be achieved, as a result of which traffic safety can also be increased.

Although the invention was illustrated and explained in more detail by preferred exemplary embodiments, the invention is not restricted by the disclosed examples and other variations can be derived therefrom by a person skilled in the art without leaving the scope of protection of the invention. It is therefore clear that a large number of possible variations exists. It is also clear that embodiments mentioned as examples actually only represent examples which are not to be interpreted in any way as a limitation of, for example, the scope of protection, the possible applications, or the configuration of the invention. Rather, the preceding description and the description of the figures make a person skilled in the art capable of specifically implementing the exemplary embodiments, wherein a person skilled in the art aware of the disclosed concept of the invention can perform manifold modifications, for example, with respect to the function or the arrangement of individual elements mentioned in an exemplary embodiment without leaving the scope of protection defined by the claims and their legal equivalents, such as more extensive explanations in the description.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A driver monitoring system for a vehicle, comprising:
at least one output device configured to output at least one attentiveness warning;
a monitoring module configured to monitor a driver of the vehicle and to recognize inattentiveness states of the driver; and
a control module configured to:
accumulate a duration of the recognized inattentiveness states within a finite time window having a predetermined length in order to determine an accumulated inattentiveness duration for the finite time window;
actuate the at least one output device for the output of the at least one attentiveness warning based on the accumulated inattentiveness duration and a tempo measure of an increase of the accumulated inattentiveness duration; and
carry out a reset of the accumulated inattentiveness duration based on the tempo measure of the increase of the accumulated inattentiveness duration.

2. The driver monitoring system according to claim 1, wherein the control module is further configured to:
actuate the at least one output device to output the at least one attentiveness warning when the accumulated inattentiveness duration reaches or exceeds a first threshold value; and
actuate the at least one output device to hide the at least one attentiveness warning when the accumulated inattentiveness duration subsequently reaches or falls below the first threshold value or a second threshold value.

3. The driver monitoring system according to claim 1, wherein the finite time window is a sliding time window.

4. The driver monitoring system according to claim 3, wherein
one end of the sliding time window corresponds to a current time, and/or
the predetermined length of the finite time window is in a range between 10 and 50 seconds.

5. The driver monitoring system according to claim 1, wherein
the tempo measure of the increase of the accumulated inattentiveness duration corresponds to a slope of the accumulated inattentiveness duration over time, and
the slope of the accumulated inattentiveness duration corresponds to a first derivative of the accumulated inattentiveness duration according to time.

6. The driver monitoring system according to claim 1, wherein the control module is further configured to:
carry out the reset of the accumulated inattentiveness duration more slowly the greater the tempo measure is.

7. The driver monitoring system according to claim 1, wherein the control module is further configured to:
set the predetermined duration of the finite time window variably based on the tempo measure of the increase of the accumulated inattentiveness duration in order to set a speed of the reset of the accumulated inattentiveness duration.

8. The driver monitoring system according to claim 7, wherein the control module is further configured to:
increase the predetermined duration of the finite time window when the tempo measure reaches or exceeds a threshold; and/or
increase and/or reduce the predetermined duration of the finite time window in accordance with the tempo measure.

9. A vehicle comprising the driver monitoring system according to claim 1.

10. A method for driver monitoring, comprising:
detecting a driver of the vehicle and recognizing inattentiveness states of the driver;
accumulating a duration of the recognized inattentiveness states within a finite time window having a predetermined length;
outputting at least one attentiveness warning when the accumulated duration of the inattentiveness states within the finite time window reaches or exceeds a first threshold value;
resetting the accumulated duration of the inattentiveness states within the finite time window based on a tempo measure of an increase of the accumulated inattentiveness duration; and
hiding the at least one attentiveness warning based on the reset of the accumulated duration of the inattentiveness states within the finite time window.

11. A computer product comprising a non-transitory computer readable storage medium having program code stored thereon which, when executed on one or more processors, causes the acts of:
detecting a driver of the vehicle and recognizing inattentiveness states of the driver;
accumulating a duration of the recognized inattentiveness states within a finite time window having a predetermined length;
outputting at least one attentiveness warning when the accumulated duration of the inattentiveness states within the finite time window reaches or exceeds a first threshold value;
resetting the accumulated duration of the inattentiveness states within the finite time window based on a tempo measure of an increase of the accumulated inattentiveness duration; and
hiding the at least one attentiveness warning based on the reset of the accumulated duration of the inattentiveness states within the finite time window.

* * * * *